United States Patent [19]

Stricklin et al.

[11] 4,412,260
[45] Oct. 25, 1983

[54] CARTRIDGE RECEIVER MECHANISM

[75] Inventors: John D. Stricklin; Anthony D. Denero; Robert A. Quatro, all of Oklahoma City, Okla.; James A. Duff, Omaha, Nebr.

[73] Assignee: Magnetic Peripherals Inc., Minneapolis, Minn.

[21] Appl. No.: 257,086

[22] Filed: Apr. 24, 1981

[51] Int. Cl.³ ............................................. G11B 5/012
[52] U.S. Cl. ...................................... 360/97; 360/132
[58] Field of Search ............... 360/60, 66, 133, 97–99, 360/132

[56] References Cited

U.S. PATENT DOCUMENTS

| | | | |
|---|---|---|---|
| 3,529,301 | 5/1968 | Hiruta | 360/97 |
| 3,899,794 | 8/1975 | Brown, Jr. | 360/133 |
| 3,950,786 | 4/1976 | Shapley | 360/60 X |
| 4,053,935 | 10/1977 | Shiba | 360/60 |
| 4,078,246 | 5/1978 | Berthoux et al. | 360/133 |
| 4,113,262 | 9/1978 | De Stephanis | 360/97 |
| 4,301,486 | 11/1981 | Brown et al. | 360/133 X |
| 4,320,422 | 3/1982 | Rinkleib | 360/60 |
| 4,320,430 | 3/1982 | Vogt | 360/133 |

Primary Examiner—Aristotelis M. Psitos
Assistant Examiner—Kin C. Wong
Attorney, Agent, or Firm—Frederick W. Niebuhr; Joseph A. Genovese

[57] ABSTRACT

A mechanism is disclosed for receiving a disk cartridge and guiding the cartridge to an operating position within a disk drive, and for subsequently ejecting the cartridge when its use is complete, all responsive to the opening and closing of the disk drive door. The mechanism for ejecting the cartridge also automatically opens a transducer head access door when the cartridge is inserted into the receiver, and automatically closes the door upon cartridge ejection. Improvements are also disclosed in the manner of mounting a lift collar designed to support the disk and hub within a cartridge, and for an improved method of adjusting the cartridge to operate alternatively in write protect and write enable modes.

14 Claims, 23 Drawing Figures

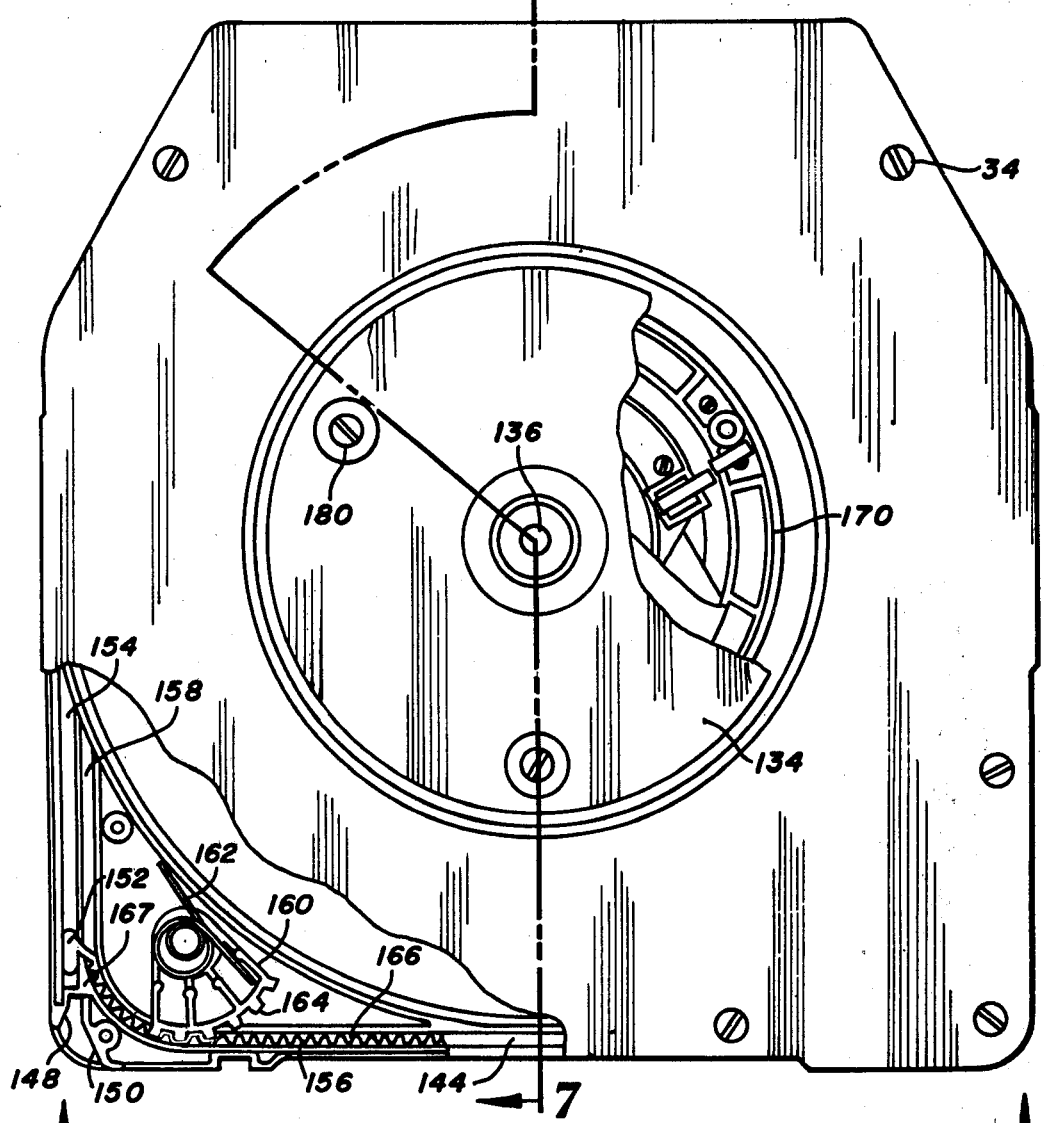
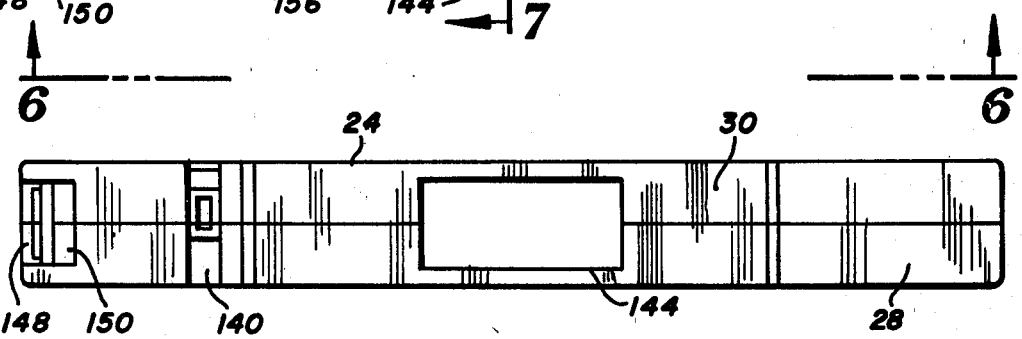

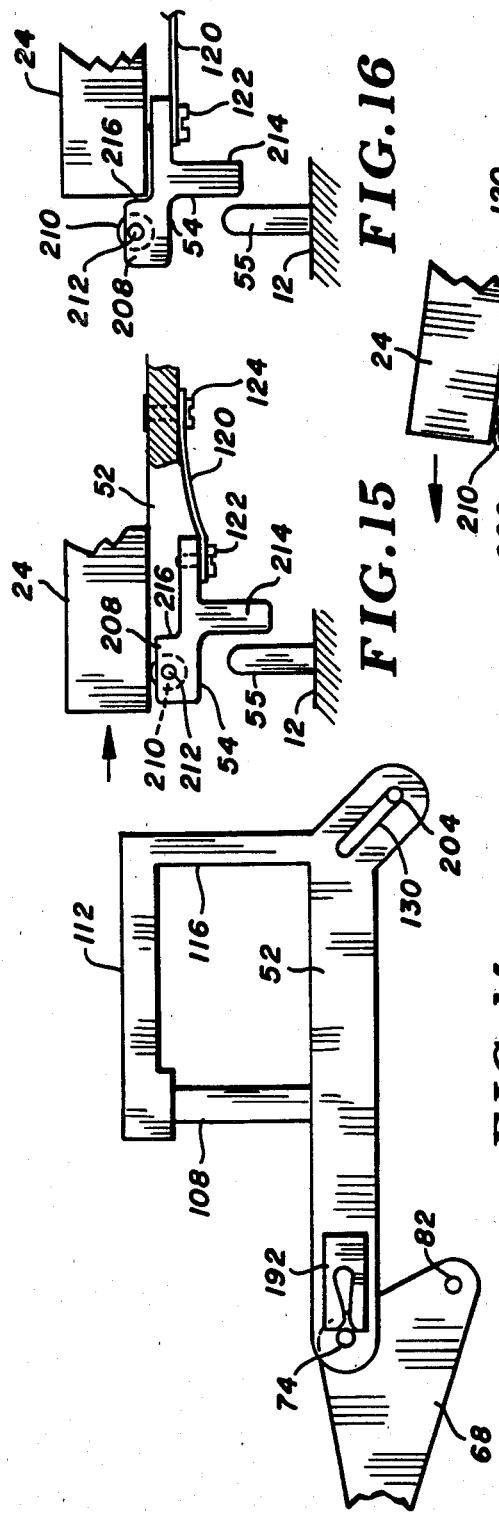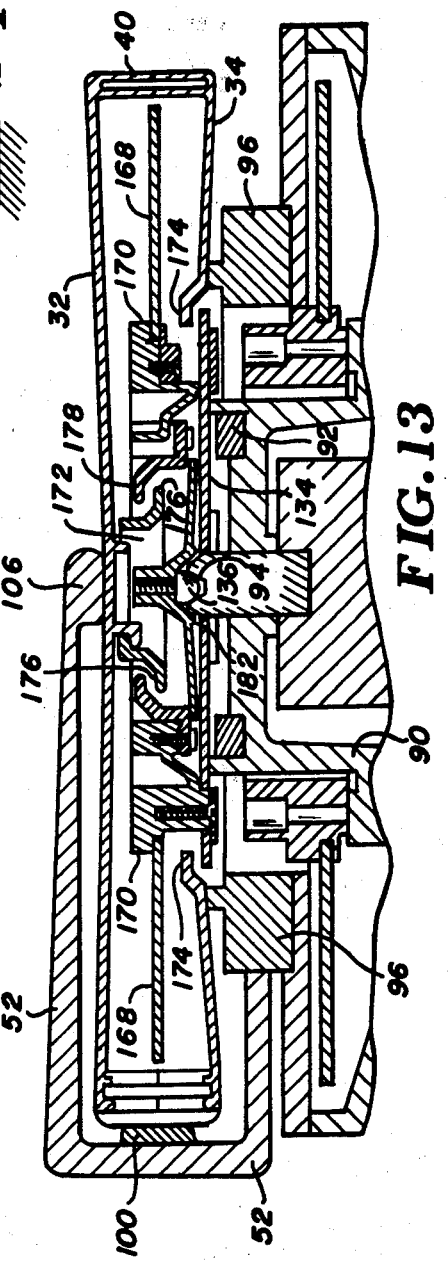

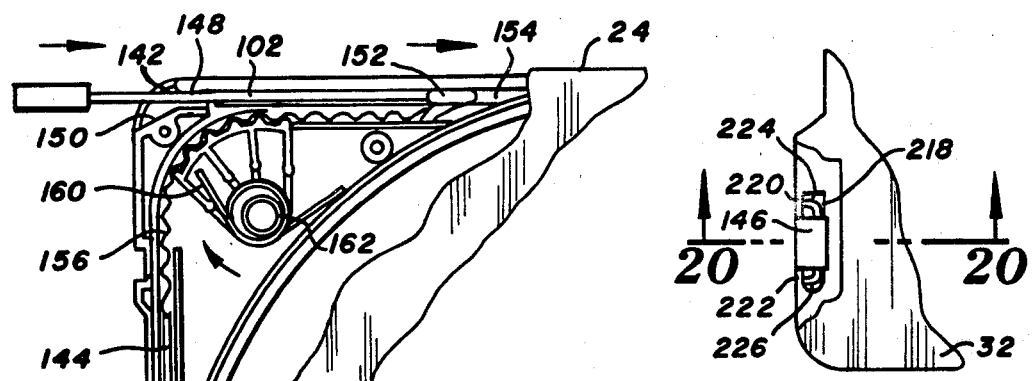
FIG.18
FIG.19
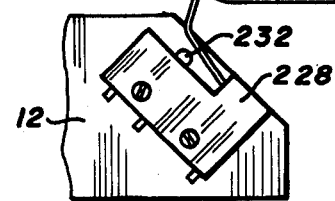
FIG.20
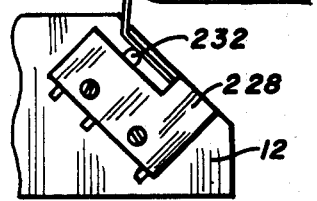
FIG.21
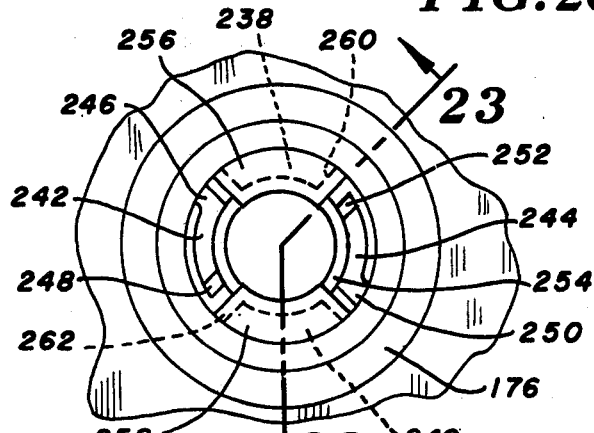
FIG.22
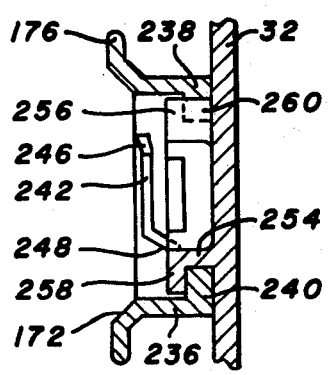
FIG.23

CARTRIDGE RECEIVER MECHANISM

BACKGROUND OF THE INVENTION

This invention relates to memory devices including magnetic disks and disk drives. Types of disk drives include those permanently enclosing one or more disks, drives adapted for insertion and removal of disks, and combination drives having both permanent and interchangeable disks. Permanently mounted disks can be enclosed in sealed compartments to avoid entry of dust and other foreign matter. Removable disks however must include features which reduce contamination and damage during use, storage and handling, and further must have features to facilitate convenient yet accurate loading and removal of disks.

One approach to meet these needs is shown in U.S. Pat. No. 3,800,325 to O'Brian, granted Mar. 26, 1974. A wire receiver 16 is pivotally mounted to a disk drive. As a cartridge is inserted into the receiver, a bar 104 lifts a cover member 106 to reveal a normally closed opening 58 through which transducers have access to the disk. Precision surfaces guide the cartridge to a substantially centered position as receiver 16 is pivoted to its closed position. In U.S. Pat. No. 3,593,327 to Shill, granted July 13, 1971, there is shown an opening 20 for heads exposed by the pivotong of a shutter 70 upon insertion of cartridge 10 into the receiver. A prod 94 mounted with respect to the receiver pushes a leaf spring 90 in the cartridge to effect the pivoting.

Pivotal cartridge travel can hinder centering accuracy, however. To overcome this disadvantage, U.S. Pat. No. 3,950,787 to Hosaka granted Apr. 13, 1976, shows a cassette mounting receiver in which dual levers are used for mounting, thus to allow primarily vertical receiver motion just prior to full seating in the operative position. U.S. Pat. No. 3,899,794 to Brown granted Aug. 12, 1975, shows a front loading disk drive. A receiver 14 is mounted to the drive to a lever 40. Pins are contained in slots and guided so as to produce a receiver motion which is largely vertical just prior to seating in the operating position. The use of lever 40 in connection with the actuator and receiver is also advantgeous in breaking the magnetic coupling between the disk and spindle when unloading the disk cartridge. A further purpose of the structure in this patent is to conserve on vertical space in the front loading disk drive by maintaining the cartridge in a substantially horizontal attitude as it first clears the spindle then is lowered for mounting in its operating position.

The dual lever systems of these patents, while somewhat successful in controlling the attitude of an inserted cartridge, have complexity which reduces reliability. It is therefore an object of this invention to provide a comparatively simple yet equally effective and more reliable structure to accept a cartridge for insertion into a disk drive, and to guide the cartridge, once inserted, to a substantially centered position within the disk drive.

It is a further object of this invention to provide, in connection with a cartridge normally frictionally engaging a disk contained therein, to provide a receiver adapted for supplying a load to release the disk from the cartridge when in its operating position. Such a cartridge is described in U.S. Pat. No. 4,078,246 to Berthoux, granted Mar. 7, 1978. Yet another object of this invention is to provide a receiver particularly well adapted to break a magnetic coupling between a disk and a drive spindle. It is another objective of this invention to provide a means to eject the cartridge for more convenient removal from a disk drive.

SUMMARY OF THE INVENTION

To achieve these and other objects, there is provided, for mounting a disk cartridge in a disk drive, apparatus including a housing and means defining an interior opening through which a disk cartridge is insertable into the housing. A receiver in said housing includes a substantially rigid frame adapted to confine the cartridge, once inserted therein, at an attitude conforming to that of the frame.

An actuator means, mounted for movement relative to said housing between open and closed positions, is provided for moving said frame between extended and retracted positions corresponding to the open and closed positions, respectively. The frame in its extended position is adapted to receive the cartridge inserted longitudinally inward through the opening. When the receiver is moved to its retracted position, it carries the disk to a driving engagement with the spindle.

A first connecting means mounts the receiver frame to the housing and restricts movement of the frame to transverse axial rotation and linear translation between anterior and posterior positions with respect to the housing. A second connecting means mounts the actuator means to the receiver frame and restricts movement of the actuator means to transverse axial rotation and linear translation between first and second actuator positions relative to the frame. The first actuator and anterior positions correspond to the open position, while the second actuator and posterior positions correspond to the closed position. Detent means operate during pivoting of the actuator means inward from the open toward the closed position. The detent means maintains said actuator means substantially in its first actuator position until the receiver is moved from the anterior position to the posterior position. This defines an intermediate stage for the receiver frame. Further inward actuator means movement to its closed position moves the actuator beyond the detent means to its second actuator position relative to the frame.

The actuator means can include two opposed actuator plates mounted pivotally to the housing and integral with one another. The first connecting means can include two opposed elongated posterior slots in the receiver frame, and two opposed housing projections integral with the housing, one extending through each posterior slot. Each projection has a diameter preferably substatially equal to the width of its associated posterior slot.

The second connecting means accordingly can include two opposed elongated anterior slots in the receiver frame, and two opposed actuator projections, one integral with each actuator plate and extended through one of the anterior slots. Each actuator projection has a diameter approximately equal to the width of its associated anterior slot. Each lift projection is spaced from the plate pivot axis to traverse an arcuate path upon actuator motion.

A suitable detent means is a spring mounted proximate one of said anterior slots and normally shaped to confine the actuator projection associated therewith substantially at one end of said anterior slot. Continued inward pivoting of the actuator plates, after the receiver frame has reached the intermediate stage, elastically deforms the detent spring to allow movement of the associated actuator projection away from the end of its anterior slot, thus to position the receiver in its retracted position.

The orientation of the anterior and posterior slots is advantgeously selected so that movement of the receiver rearward end, between the extended and intermediate stage, is largely linear with respect to the housing, and rearward and downward relative thereto. Also, the slots may be located so that movement following the intermediate stage is pivotal about the housing projections and is substantially vertical arcuate travel for the frame and cartridge as the cartridge is positioned against the spindle. Thus, insertion and removal of the disk can occur using relatively compact space and with accurate positioning of the cartridge in the drive. Also, as the substantially identical path is traced in removing the disk, the initial vertical pivoting upon removal is well suited for breaking the magnetic coupling between the spindle and disk.

Another feature of the invention is a means to eject the cartridge when it is desirable to remove the same from the drive. The ejection structure includes a linking member supported in the cartridge for forward and rearward movement. A biasing means urges rearward movement of the linking member with respect to the cartridge, and a stop means prevents such movement of the linking member beyond a linking position. A forwardly directed probe is mounted to the receiver frame and positioned to enter a cavity in the cartridge wall to contact the linking member as the cartridge is inserted into the receiver. Further cartridge insertion after such contact moves the linking member forwardly relative to the cartridge against the force of the biasing means. A latching means mounted to the frame is positioned to engage an anterior surface of the cartridge substantially as the cartridge reaches a seated position in the frame and thus retain the cartridge in its seated position against the force of the biasing means. A releasing means, mounted to the housing, is positioned to contact the latching means whenever the frame is moved forward from its retracted position thus releasing the latching means to allow cartridge ejection responsive to the biasing means.

A movable panel normally covering a head access port can be connected to the linking member, so that as the cartridge is inserted into the receiver frame, the panel is removed from the head access port. Upon subsequent release of the cartridge, the biasing means which ejects the cartridge also causes the panel to move to its original position, thus closing the head access port.

IN THE DRAWINGS

Other features and advantages of the invention will become apparent upon reading the following detailed description and upon reference to the drawings, in which:

FIG. 5 is a bottom plan view of the cartridge with wall portions cut away for clarity in illustrating features contained in the cartridge;

FIG. 6 is an end view taken along the line 6—6 in FIG. 5;

FIG. 13 is a sectional view similar to that in FIG. 7 but with the cartridge mounted in the disk drive;

FIG. 14 is a diagrammatical view of the receiver in a cartridge eject position;

FIGS. 15, 16 and 17 illustrate a latch and latch release for containing and subsequently ejecting a cartridge with respect to the receiver;

FIG. 18 is a partial bottom view similar to that in FIG. 5 but with the ejector and head door closure mechanism in a loaded position;

FIG. 19 is an enlarged partial top view of the cartridge;

FIG. 20 is a sectional view taken along the line 20—20 in FIG. 19, and further illustrates a write enable switch mounted to the drive with the cartridge loaded in the drive;

FIG. 21 is a view similar to that in FIG. 20, but with the write enable switch in a write enable position;

FIG. 22 is a plan view of a lift collar mounted to the top of the cartridge; and FIG. 23 is a sectional view taken along the line 23—23 in FIG. 22.

DETAILED DESCRIPTION OF THE PREFERRED EMBODIMENT

Figure 1:
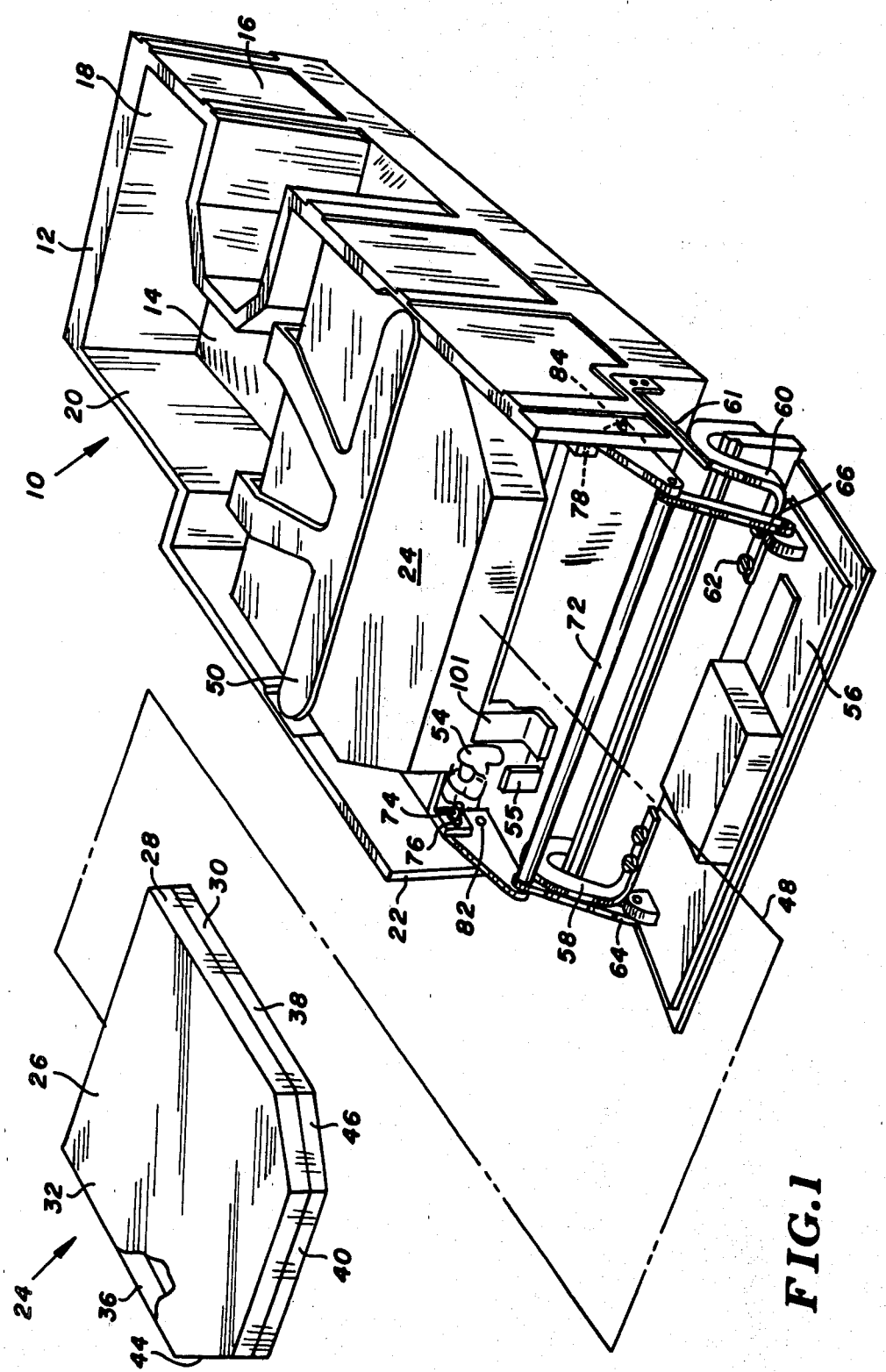
FIG. 1 is a perspective view of a disk drive and disk cartridge constructed in accordance with the invention.

Referring to the drawings, there is shown in FIG. 1 a disk drive 10 having a housing 12 including a horizontal floor 14, vertical side walls 16, 18 and 20, and a ceiling, parallel to the floor but not shown. Side walls 16 and 20 cooperate with floor 14 and the ceiling to form an anterior opening 22 through which a disk containing cartridge, such as that shown at 24, may be inserted into housing 12 and removed therefrom.

Cartridge 24 includes a cartridge casing 26 formed of an upper casing half 28 and a lower casing half 30. Upper half 28 includes a top wall 32 while the lower half contains a bottom wall 34. The casing halves when joined form walls including first and second side walls 36 and 38, a forward wall 40, a rear wall 42, and first and second beveled walls 44 and 46. The bottom and rear walls of cartridge 24 are visible in FIG. 3.

Returning to FIG. 1, it is seen that cartridge 24 is insertable through anterior opening 22 longitudinally of housing 12, i.e., along a longitudinal axis 48. As it is so inserted, cartridge 24 is captured by a receiver 50, movable with respect to housing 12. The receiver is shown in an extended position in which it is particularly well adapted to receive the cartridge moving inwardly through opening 22. Receiver 50 includes a substantially rigid frame 52, preferably an aluminum casing, and a latch 54 mounted to the forward end of the frame and adapted to engage forward wall 40 once cartridge 24 is fully inserted into receiver 50, thus preventing outward movement of the cartridge with respect to frame 52. Cartridge 24, when so inserted, conforms to the generally horizontal attitude of the frame. A latch release 55, mounted to the housing, is adapted to allow cartridge ejection following use.

Receiver 50 is movable, from its extended position to a retracted position with respect to the housing, responsive to the closing of a door 56 pivotally attached to housing 12 through first and second hinges 58 and 60. A hinge detent 61 prevents unintentional door movement. A second hinge detent associated with hinge 58 is not shown. The hinges are attached to the door by a plurality of screws 62, and pivotally mounted at the opposite sides of housing 12. The linkage for moving receiver 50 responsive to door movement includes: first and second elongate poles 64 and 66 mounted to the door at opposite sides thereof; and first and second actuator plates 68 and 70 pivotally attached to the opposite ends of the first and second poles, respectively, and also connected to the receiver. A rigid bar 72, connected at the two pole/actuator plate pivots and extending along the pivot axis, adds strength and stability to the linkage.

In addition to its pivotal mounting to its associated pole, each actuator plate is also pivotally mounted with respect to housing 12. Like the actuator plate/pole pivots, the two actuator plate/housing pivots share a single pivot axis which is horizontal and transverse, or perpendicular to longitudinal axis 48. A connecting means between the actuator plates and receiver 50 includes a first actuator pin 74 extended from actuator plate 68 through a first anterior slot 76 in the receiver, and a second actuator pin 78 integral with actuator plate 70 and extended through a second anterior slot 80 in the receiver. Pins 74 and 78, and anterior slots 76 and 80, are opposite one another and aligned. The actuator plates are mounted to the housing at first and second actuator/housing pivots 82 and 84, respectively.

Figure 2:
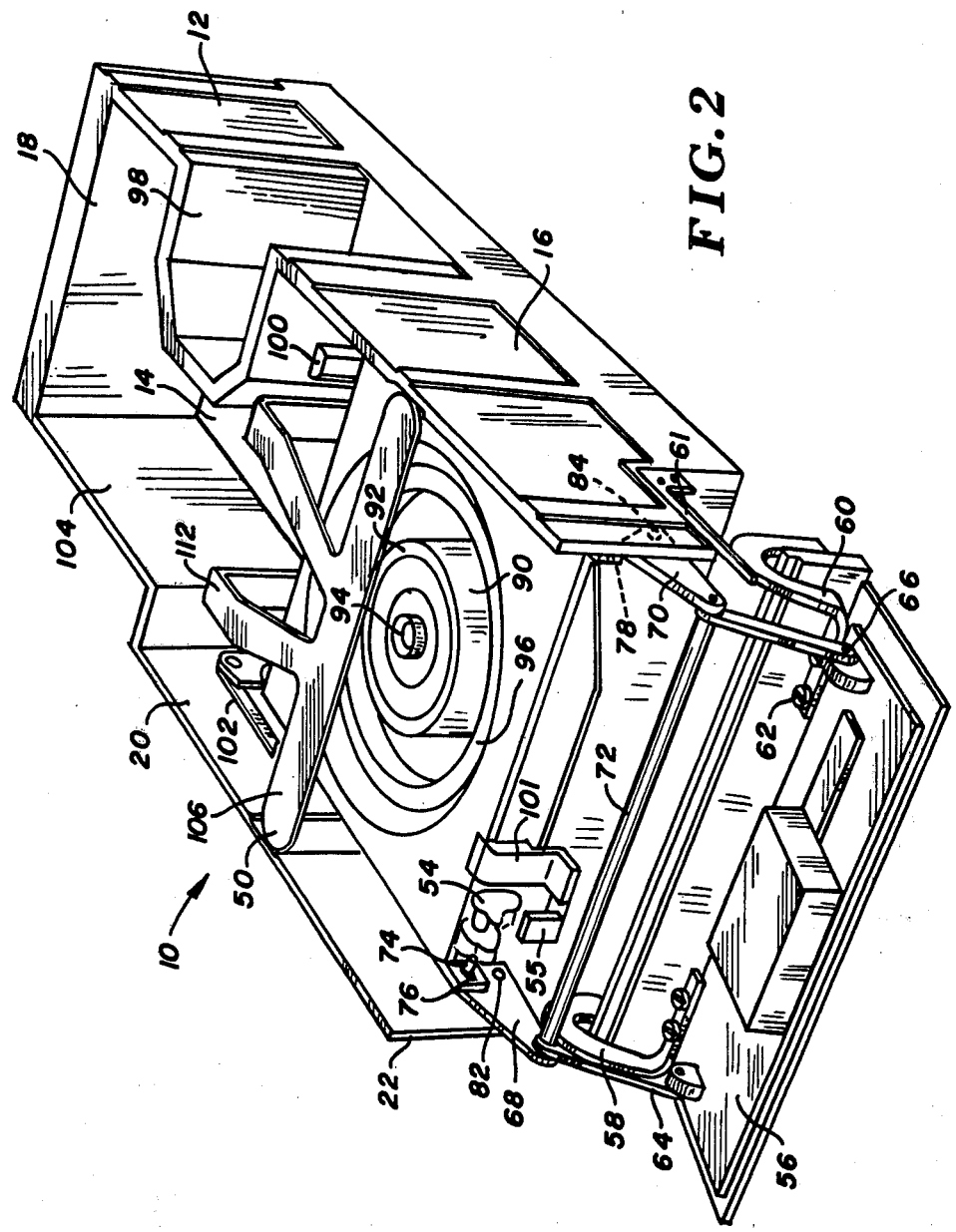
FIG. 2 is a perspective view of the disk drive of FIG. 1 with the cartridge removed.
Figure 4:
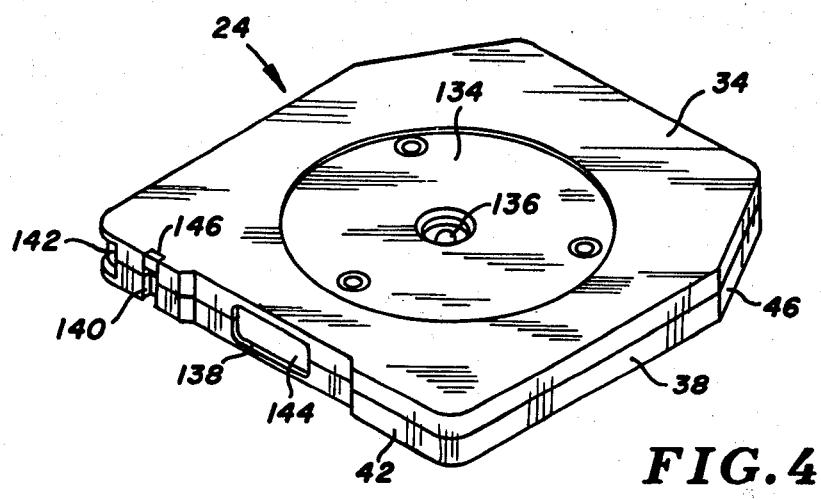
FIG. 4 is a perspective view of a cartridge of FIG. 1, inverted to display the bottom surface thereof.

FIG. 2 shows disk drive 10 with cartridge 24 removed to reveal a substantially flat base 86 of the receiver frame which supports cartridge 24 whenever the receiver is in the extended position. A receiver opening 88 is formed in the base for allowing cartridge access to a spindle 90 mounted rotatably to the housing. An annular magnet 92 is formed in the spindle for attracting a hub of a disk carried in cartridge 24. Magnet 92 attracts the hub as the disk centers itself on a centering cup 94 carried by the spindle. An annular air filter 96 surrounds the spindle and is stationary with respect to the housing. Filter 96 supports cartridge 24 once it is in the retracted position, as will be later explained. Side wall 16 forms a compartment 98 wherein an electric motor, not shown, is mounted for driving spindle 90.

The absence of cartridge 24 reveals a pad 100 which provides a rear reference surface to guide cartridge 24. A forward reference is provided by a block 101 mounted to housing 12. Also visible in the cartridge's absence is a head door actuator probe 102 mounted to the rear of frame 52 and extending forwardly. Probe 102 is adapted to open a head access door and eject cartridge 24. Transducing heads gain access into cartridge 24 at the rear wall when moved radially of the disk by means of a voice coil (not shown) preferably mounted in a compartment 104 formed by side walls 18 and 20.

Figure 3:
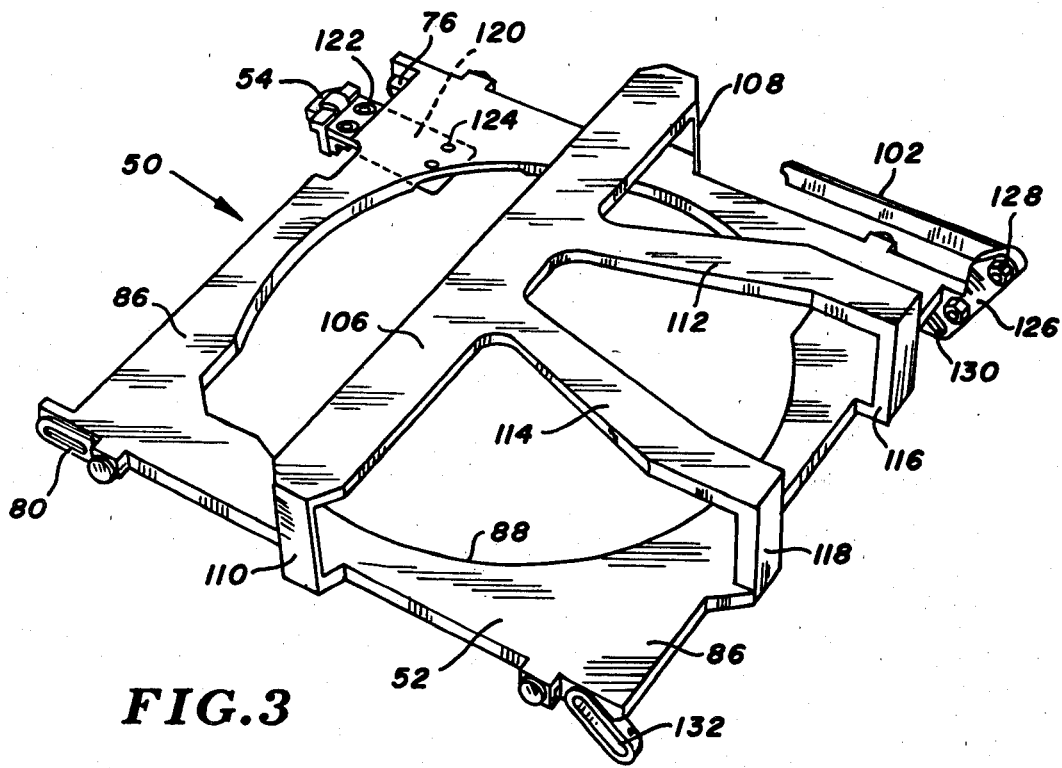
FIG. 3 is a perspective view of a receiver housed in the drive.

In FIG. 3, receiver 50 is shown removed from disk drive 10. Frame 52, in addition to base 86, includes members which confine cartridge 24 with respect to the base, including a load bar 106 attached to the base by first and second straps 108 and 110, and first and second load arms 112 and 114 attached to the base by first and second legs 116 and 118, respectively.

Latch 54 is carried at the forward end of base 86, attached thereto by a leaf spring 120, latch fasteners 122 joining the leaf spring to the latch, and spring fasteners 124 joining the spring and base. At the rear portion of frame 52 is a probe mounting bracket or support 126 to which probe 102 is mounted with a fastener 128.

Finally, it is seen that in addition to anterior slots 76 and 80, frame 52 is provided at its rearward end with first and second posterior slots 130 and 132. Receiver 50 is mounted to housing 12 by two opposed housing pins mounted to the housing, one pin extending transversely inward from each of side walls 20 and 16 and through slots 130 and 132, respectively. The anterior slots are elongate horizontally, and cooperate with the actuator pins to confine actuator motion to two types of motion relative to receiver frame 52, namely pivoting and limited horizontal translation.

Likewise, posterior slots 130 and 132 are elongated, but in an oblique direction, downward and rearward in the receiver. These slots together with the drive pins limit receiver motion, with respect to housing 12, to pivoting or transverse rotation and limited linear translation in the oblique direction of the slots.

FIGS. 4-7 illustrate the cartridge 24 in greater detail. A circular opening is formed in bottom wall 34 to accommodate an armature plate 134. The armature plate is constructed of a magnetizable material and is attracted to magnet 92 whenever cartridge 24 is proximate spindle 90. As plate 134 is moved toward spindle 90, a centering stud 136 engages centering cup 94 to center a disk in the cartridge on spindle 90, as described in more detail in U.S. patent application Ser. No. 163,539, filed on behalf of the assignee of this application. Along rear wall 42 are a head access opening or port 138, a write enable channel 140 and an actuator probe access cavity 142. Opening 138 is normally closed by virtue of a head door or panel 144. A write enable plug 146 is movable vertically in channel 140.

As seen from FIG. 5, first and second cavity walls 148 and 150 converge forwardly and inwardly and thus are adopted to capture probe 102 and guide it into cavity 142, even if the probe and cavity are not precisely aligned. A linking member 152, positioned to be contacted by probe 102 as it enters the cartridge, is movable along a link guide track 154 in the forward and reverse directions, i.e., longitudinally as referenced in FIG. 1. Attached to linking member 152 is one end of a flexible rack or belt 156, which is attached at its opposite end to head door 144. The belt and door are mounted to slide in a belt guide track 158 as the linking member slides in track 154.

A sector 160 is rotatably mounted to cartridge 24, and is continually biased in the counterclockwise direction, as viewed in FIG. 5, by a torsion spring 162. The sector has a plurality of teeth 164 which engage corresponding teeth 166 in belt 156, whereby the belt and sector cooperate as a flexible rack and a pinion. When cartridge 24 is removed from disk drive 10, sector 160 is held by spring 162 as seen in FIG. 5, thus maintaining head door panel 144 in the closed position and linking member 152 in a linking position against a wedge 167.

Figure 7:
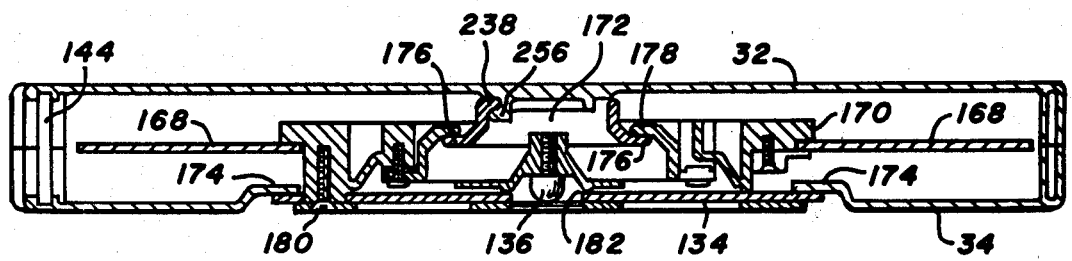
FIG. 7 is a sectional view taken along the line 7—7 in FIG. 5.

FIG. 7 shows a magnetic disk 168 attached to a central hub 170, the hub and disk being enclosed within cartridge 24. Whenever cartridge 24 is free of drive 10, a retaining means frictionally holds the hub and the disk immobile with respect to the cartridge. The retaining means includes a lift collar 172 mounted to top wall 32, and an annular lip 174 in bottom wall 34. Lift collar 172 has a flared collar rim 176 beneath and against a top inner rim 178 of hub 170, while lip 174 is positioned above and against armature plate 134. During assembly of the cartridge, armature plate 134 is fastened to hub 170 by screws such as that shown at 180. As the armature plate and hub are drawn together, they move top and bottom walls 32 and 34 inward, elastically, from a normally more convex configuration. The reaction forces between rims 176 and 178, and between lip 174 and actuator plate 134, frictionally hold the hub and disk immobile. These forces further ensure positive contact to prevent entry of dust and other foreign matter into cartridge 24. A sealing ring 182 contacts the armature plate near an opening for centering stud 136 for further protection against contamination.

Figure 8:
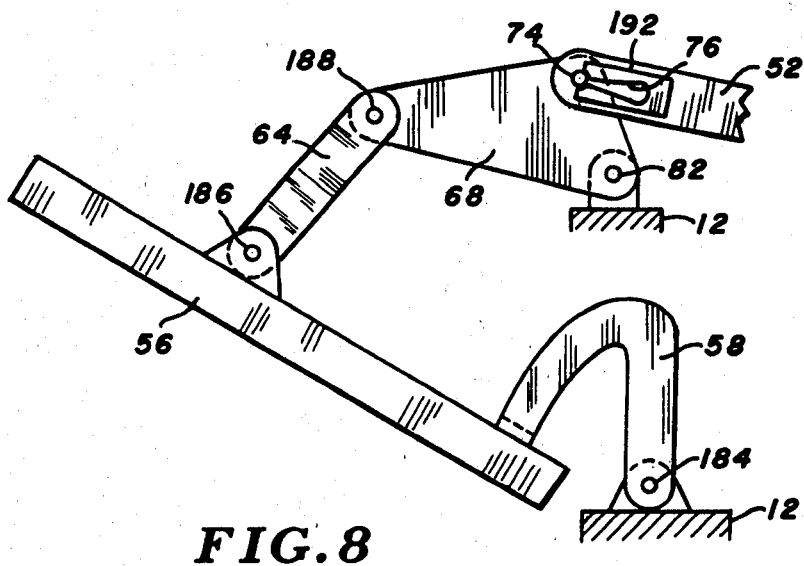
FIG. 8 is a diagrammatical view of the linkage connecting the door, housing and receiver of the disk drive.

FIG. 8 is a side view diagrammatically illustrating operation of the linkage between door 56 and actuator plate 68 which causes the plate to move from an open position to a closed position response to the closing of door 56. While only first pole 64, first actuator plate 68 and first hinge 58 are shown, it is to be understood that their corresponding parts, i.e., second pole 66, second actuator plate 70 and second hinge 60 are substantially identical and act in concert. Purely pivotal connections include a hinge pivot 184 between hinge 58 and housing 12, a door pivot 186 between door 56 and pole 64, a pole pivot 188 between the pole and actuator plate 68, and actuator pivot 82 between the actuator plate and housing. The connection between the actuator and receiver frame 52 includes actuator pin 74 and slot 76, which has a width substantially equal to the diameter of pin 74. Hence, the actuator plate, with respect to the receiver frame, is allowed two types of motion: rotation about the axis of pin 74, designated as transverse rotation in the sense that it is about a horizontal axis normal to longitudinal axis 48 in FIG. 1; and linear translation effected by a sliding of pin 74 within slot 76, between first and second actuator positions.

Figure 9:
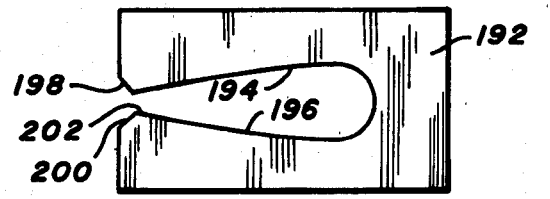
FIG. 9 illustrates a detent spring carried by the receiver.

Mounted adjacent to slot 76 is a pin detent spring 192. As seen in FIG. 9, spring 192 is flat and generally U-shaped, having first and second gradually inclined surfaces 194 and 196, and first and second steeply inclined surfaces 198 and 200, converging at a neck 202.

Figure 10:
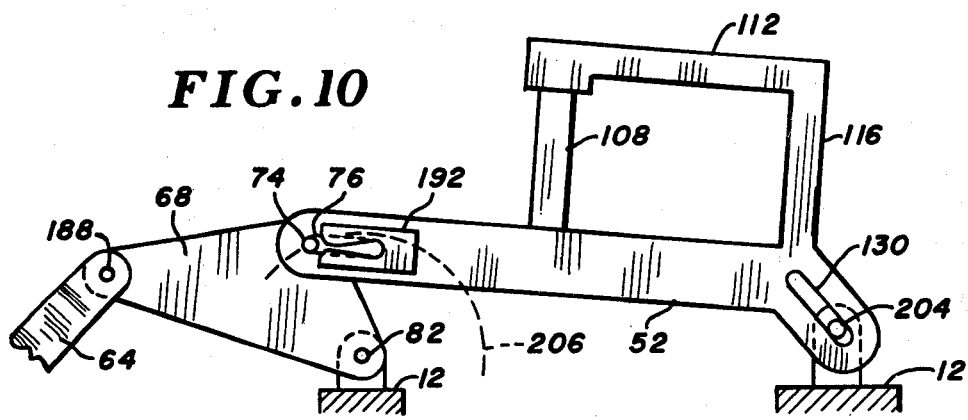
FIGS. 10, 11 and 12 illustrate diagrammatically, movement of the receiver within the disk drive.
Figure 11:
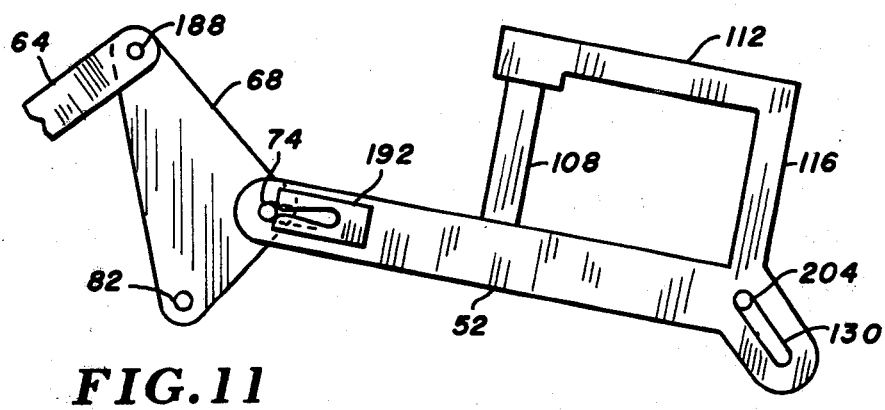
Figure 12:
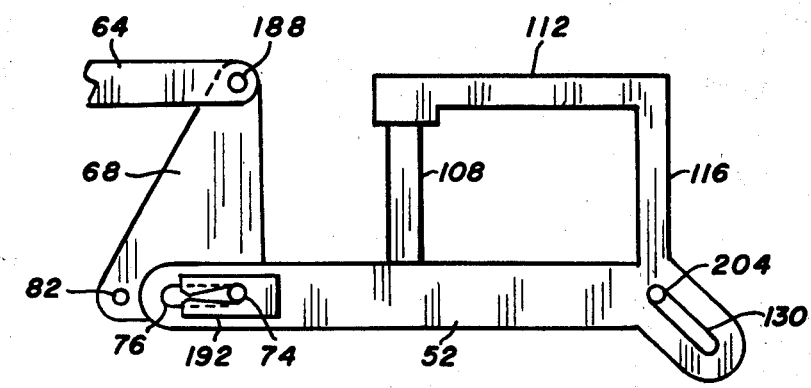

As perhaps most clearly understood from inspection of FIGS. 10-12, detent spring 192 cooperates with slots 76, 80, 130 and 132, and with the associated pins contained in the slots, to control receiver motion and thus guide an inserted cartridge such as cartridge 24 to an operating position in drive 10. While no cartridges are shown in FIGS. 10-12, such is for clarity of illustration only. It is to be recognized that a cartridge loaded into frame 52 is constrained to follow frame motion.

FIG. 10, like FIG. 8, is equivalent to FIGS. 1 and 2 in that door 56 is opened and the receiver is in its extended position. A drive pin 204, mounted to housing 12, has a diameter substantially equal to the width of slot 130 whereby receiver frame 50, with respect to housing 12, is confined to transverse rotation and linear translation as effected by a sliding of slot 130 on pin 204 between an anterior position and a posterior position. In FIG. 10, frame 52 is near its anterior position, while actuator plate 68 is in its first actuator position.

As door 56 is moved toward its closed position, pole 64 bears against actuator plate 68 in the clockwise direction. The actuator plate accordingly begins to pivot about actuator pivot 82 in the clockwise direction as viewed in FIG. 10, thus moving pin 74 in an arcuate path indicated by the broken line at 206. After travel of but a slight distance along the arcuate path, pin 74 contacts surfaces 198 and 200 of detent spring 192, and spring 192 resists further motion of the pin with respect to frame 52. Consequently, the frame is caused to travel along with pin 74 as it rotates about pivot 82, and slot 130 is caused to slide on pin 204 until it reaches the posterior position with respect to the housing, i.e., the position shown in FIG. 11. In FIG. 11, receiver frame 52 is shown at an intermediate stage between its extended and retracted positions, with frame 52 moved to its posterior position, while actuator 68 remains in its first position.

Further closing of door 56 continues to rotate actuator plate 68 inwardly or clockwise as seen in FIG. 11, and thus continues to drive pin 74 along arcuate path 206. Receiver frame 52, however, cannot continue moving rearward and downward, having already reached its posterior position with respect to the housing. Consequently, the force of pin 74 upon the detent spring, specifically at surfaces 198 and 200, is significantly increased, and reaches an amount enabling continued travel of pin 74 rearward beyond neck 202. The result is that pin 74 slides rearwardly in slot 76 as it travels along arc 206 while receiver frame 52 is rotated in the counterclockwise direction as viewed in FIG. 11 about pin 204. Continued motion eventually results in door 56 reaching its closed position, with receiver frame 52 reaching the retracted position shown in FIG. 12.

FIG. 13 is a sectional view similar to that of FIG. 7, but with cartridge 24 in its operating position within disk drive 10. Receiver 52 is in its retracted position having carried cartridge 24 rearward and downward as described in connection with FIGS. 10-12. In the retracted position, load bar 106 applies a downward force against cartridge top wall 32, thus to firmly position bottom wall 34 against annular air filter 96. Walls 32 and 34 elastically deform responsive to pressure between bar 106 and filter 96, and assume a relatively increased concavity in the outward directions, as is shown in FIG. 13 in exaggerated form. Hub 170 is supported on spindle 90 through centering stud 136 within centering cup 94. Consequently, downward travel of lift collar 172, as top wall 32 is elastically deformed, separates the lift collar from the hub. Also, the elastic bending of bottom wall 34 raises annular lip 174 above armature plate 134. This frees hub 170 with respect to the cartridge casing, and allows rotation of disk 168 while the cartridge casing is held stationary in drive 10.

Opening of door 56 moves actuator pin 74 along its arcuate path, but in the counterclockwise direction. The forward end of receiver frame 52 is raised, but it does not follow the actuator pin arc. This is because detent spring 192 is configured for insubstantial resistance to forward travel of pin 74 in slot 76, due to the provision of gradually inclined surfaces 194 and 196 which, as compared to surfaces 198 and 200, provide less resistance to pin travel. Also, magnetic hub/spindle attraction resists horizontal receiver movement. Hence the receiver, responsive to initial opening of the door, follows its relatively large radius arcuate path about pin 204. In the early stage of this clockwise receiver motion, it is equivalent to essentially vertically upward motion which is highly desirable for breaking the magnetic coupling between armature plate 134 and magnet 92 to free the hub from the spindle. The essentially vertical path also ensures that the hub center will clear the spindle prior to any substantial horizontal receiver motion. Continued pivoting results in actuator pin 74 returning to its first actuator position, abutting of the forward end of anterior slot 76, thus moving frame 52 to the intermediate stage of FIG. 11.

Further opening of the door causes actuator pin 74 to pull the receiver frame front end with it in its relatively small diameter arcuate path 206. The rearward end of frame 52 is thus caused to move forward relative to pin 204 until the frame reaches the extended position shown in FIG. 10.

After door 56 has been opened sufficiently to move frame 52 to its extended position, there remains an allowance for slightly further opening of the door and movement of the frame to an eject position in which the frame, more specifically at slot 130, is moved competely to its anterior position with respect to pin 204 and the housing, as is shown in FIG. 14. In this eject position, receiver frame 52 causes the release of latch 54 thereby freeing cartridge 24 from the receiver.

FIGS. 15, 16 and 17 illustrate respectively the insertion, capture and release of the cartridge from receiver 50. As seen from FIG. 15, latch 54 is mounted movably on receiver 50 by leaf spring 120. Latch 54 includes an elevated portion 208 in which a roller 210 is mounted for rotation about a horizontal and transverse axle 212. A leg 214 extends downwardly from latch 54. As cartridge 24 is inserted in the direction indicated by the arrow, it moves latch 54 downwardly relative to frame 52, thus elastically deforming leaf spring 120, and rides on roller 210 as it is so inserted.

Continued insertion moves the cartridge inward beyond elevated portion 208. This allows an upward return of latch 54 to position the cartridge against a latch retaining surface 216. As shown in FIG. 16, the latch is thus positioned to prevent outward movement of the cartridge with respect to the receiver frame. In this Fig., receiver frame 52 remains in its extended position, but as cartridge 24 is fully inserted into the frame the cartridge will be guided, constrained to move with the frame, towards its centering position as the frame is moved to its retracted position.

The opening of door 56 for removal of the cartridge moves receiver frame 52 from its retracted to its extended position as previously described, thus to position the latch as shown in FIG. 16. For cartridge ejection, door 56 is further opened to move receiver 50 from the extended position of FIG. 10 to the eject position shown in FIG. 14. This is a substantially horizontal and outward or forward motion which carries leg 214, normally behind latch release 55, forwardly to contact the release. Further forward movement of the receiver responsive to opening of the door bends leaf spring 120 to rotate latch 54 counterclockwise as viewed in FIG. 17, sufficiently to lift cartridge 24 free of retaining surface 216. Surface 216 is thus moved downward with respect to forward wall 40, allowing cartridge 24 to eject forward.

Turning to FIG. 18, a mechanism is shown to enhance the ejection of cartridge 24 from receiver 50 in response to movement of latch 54 to its release position. As the ejection mechanism functions also as the head door control mechanism, it is advantageous to consider FIG. 18 in connection with FIG. 5. Sector 160 in FIG. 5 is in a closed position with torsion spring 162 acting as a biasing means which keeps the sector in such position. Insertion of probe 102 into cavity 142 brings it into contact with linking member 152. Further forward movement of the probe with respect to the cartridge moves the linking member forward as well as shown in FIG. 18. Of course, with respect to the housing 12, it is cartridge 24 which is moving rearward and not probe 102 moving forward. Nonetheless, understanding of the eject/head door mechanism is enhanced by considering motion of parts with respect to cartridge 24. As linking member 152 continues to move forward in the cartridge responsive to cartridge insertion, belt 156, connected to the linking member, moves in track 158 and along with the linking member. Belt 156 carries door 144, to the left as viewed in FIG. 5 and upwardly as viewed in FIG. 8, from its closed position over head access opening 138, to an open position as shown in FIG. 18. The open position, wherein heads mounted with respect to drive 10 can gain access through opening 138, corresponds to the full insertion of cartridge 24 into receiver 50. Note that due to the interlocking of sector teeth 164 with corresponding teeth 166 in the belt, the movemet of the belt rotates the sector clockwise as viewed in FIGS. 5 and 18, against the force of torsion spring 162. The spring constant of spring 162 is such that manual insertion of cartridge 24 easily overcomes the spring's biasing force. Complete insertion moves the cartridge to the position shown in FIG. 16 where it is retained by surface 216 against forward movement relative to the receiver frame. Latch 54 thus not only holds the cartridge, but maintains sector 160 in an open position against the force of spring 162 keeping head door 144 open.

To remove and eject cartridge 24, the door is opened as previously described to move receiver 50 to its extended position, then opened further to place the receiver in the eject position to free the cartridge from latch 54. With the restraint to spring 162 thus removed, it drives sector 160 back to its closed position. This in turn causes return movement of belt 156 to close head door 144 and move linking member 152 rearward in cartridge 154. Probe 102, in contact with linking member 152, reacts against such rearward movement and causes cartridge movement forwardly with respect to the probe, thus to eject the cartridge. In practice, the cartridge is moved approximately one inch (2.54 cm) beyond the captured position illustrated in FIG. 16. Thus, the above-described mechanism opens the head door panel and loads the cartridge for later ejection; and, as it later effects such ejection, automatically closes the head door.

As seen in FIG. 19, write enable channel 140 is formed in lower casing half 30 by a channel wall 218, and first and second vertical channel ribs to 220 and 222 spaced apart from the channel wall. Write enable plug 146 is situated in channel 140 against wall 218 and between ribs 220 and 222, for vertical movement in the channel. Curved first and second channel arms 224 and 226 are preferably flexible and, when in the position shown in FIG. 19, are elastically deformed or spring loaded so as to urge plug 146 against channel wall 218. Each arm is further taperred from a relatively large width at plug 146 to a narrow width remote from the plug, so as to more evenly distribute the tensile and compressive forces generated by the elastic displacement of the arms, thus increasing the life of plug 146.

FIGS. 20 and 21 illustrate plug 146 in a write protect and write enable position, respectively. With cartridge 24 in its operative position, rear wall 42 is positioned against pad 100 while sidewalls 36 and 38 are positioned between straps 108 and 110. This places channel 140 near a write enable microswitch 228 mounted to housing 12. The switch includes a swingably mounted switch arm 230 normally biased away from a contact 232 and extending at least partially into channel 140 as shown in FIG. 20. Write enable plug 146 is held in an upper write protect position away from switch arm 230 by virtue of a forwardly extended nodule 233, inserted into an upper recess 234 to prevent downward plug movement. Upward travel of the plug is prevented by the edge of upper casing half 28. So long as plug 146 is so positioned, switch 228 remains open, thus opening circuitry (not shown) which otherwise would enable transducing heads to write signals on disk 168 and erase signals written on the disk. The write protect position is useful whenever the need arises for reading data stored on a particular disk on which the data must not be altered or erased.

When it is desirable to add or erase data on a disk, plug 146 is moved to a lower "write enable" position, in which nodule 233 is held in a lower write enable recess 235. In its lower position, plug 146 contacts switch arm 230 and pivots the arm against contact 232, thus closing electrical circuits which enable transducers associated with the disk to record and erase signals as desired. In both the write enable and write protect modes of plug 146, channel arms 224 and 226 cooperate to position the plug firmly by forcing the plug forwardly against channel wall 218.

FIGS. 22 and 23 show the joinder of lift collar 172 to top wall 32. While hub 170 has been removed to facilitate illustration, the orientation of the hub and lift collar and the manner in which the lift collar supports the hub within cartridge 24, can be understood from FIGS. 7 and 13. From FIGS. 22 and 23 it is seen that lift collar 172 includes an annular body 236, first and second arcuate, inwardly directed flanges 238 and 240, and first and second flexible legs 242 and 244. The flanges are shaped generally like discrete sections of a ring, while the legs are curved and positioned between the flanges. First leg 242 is mounted to body 236 at a leading edge 246 and supports in cantilever fashion a first tab 248 at its trailing edge. Second flexible leg 244 is similarily mounted at its leading edge 250 and likewise supports a second tab 252.

For maintaining collar 172 against top wall 32, cartridge 24 includes a tubular support 254 extended downwardly from the top wall and having a diameter smaller than that of body 236. First and second lugs 256 and 258 project radially outwardly from support 254 and are spaced from the top wall. First and second lobes or stops 260 and 262, one mounted to each lug and to top wall 32, are positioned opposite one another, each lobe occupying the space between one end of its associated lug and the top wall. When lift collar 172 abuts top wall 32 as shown in FIG. 23, tabs 248 and 252 are normally carried at a distance from the top wall equal to the distance between the lugs and the top wall.

Prior to its mounting against top wall 32, lug 172 is positioned around support 254 and in a first angular position in which legs 242 and 244 are adjacent lugs 256 and 258, i.e., in an angular position 90 degrees offset from that shown in FIG. 22. It is not critical which leg is positioned against a given lug, due to the symmetry of collar 172 and support 254. In this first position, collar 172 is moved against top wall 32, which causes an outward flexing of legs 242 and 244 relative to the collar due to the above-mentioned normal position of tabs 248 and 252.

The lift collar is then rotated clockwise as viewed in FIG. 22 with respect to top wall 32, guiding flanges 238 and 240 between the lugs and top wall. Continued clockwise rotation eventually positions each flange as shown in FIG. 22 between its associated lug and top wall 32 and against its associated lobe, and further removes each tab from contact with its associated lug, enabling the tab to assume its normal position. Rotation is then strictly limited: in the counterclockwise direction by the flanges abutting the lobes, and in the counterclockwise direction by tabs 248 and 252 abutting the lugs. Not only is collar 172 mounted quickly and without auxilliary fastening means, e.g., screws or bolts. Its mounting is substantially more secure due to the elimination of stress concentration areas that accompany such fastening means.

Thus is disclosed a simple and reliable mechanism for receiving a disk cartridge, guiding the cartridge to an operating position within a disk drive, and for subsequently ejecting the cartridge when its use is complete, all responsive to the opening and closing of the disk drive door. The mechanism for ejecting the cartridge also automatically opens a transducer head access door when the cartridge is inserted into the receiver, and automatically closes the door upon cartridge ejection. Improvements are also disclosed in the manner of mounting a lift collar designed to support the disk and hub within a cartridge, and for an improved method of adjusting the cartridge to operate alternatively in write protect and write enable modes.

What is claimed is:

1. For mounting a disk cartridge in a disk drive, apparatus including:
    a housing, and means defining an anterior opening through which a disk cartridge is insertable into the housing; a spindle mounted in said housing and adapted to driveably engage a disk carried in said cartridge;
    a receiver in said housing including a substantially rigid frame adapted to confine said cartridge, once inserted therein, to an attitude conforming to that of the frame;
    an actuator means mounted for movement relative to said housing between open and closed positions, for moving said frame between extended and retracted positions corresponding to said open and closed positions, respectively, said frame in its extended position adapted to receive said cartridge inserted longitudinally inward through said opening and, when moved to its retracted position, to carry said disk to a driving engagement with the spindle;
    a first connecting means for mounting said receiver frame to the housing and for restricting movement of said frame to transverse rotation and linear translation between anterior and posterior positions with respect to the housing;
    a second connecting means for mounting said actuator means to the receiver frame and for restricting movement of said actuator means to transverse rotation and linear translation between first and second actuator positions relative to said frame; said first actuator and anterior positions corresponding to said open position, and said second actuator and posterior positions corresponding to said closed position; and
    detent means, operative during pivoting of said actuator means inward from the open position toward the closed position, for maintaining said actuator means substantially in its first actuator position until said receiver is moved from the anterior position to the posterior position, thus to define an intermediate stage for said receiver frame between said extended and retracted positions, further inward movement of said actuator means to the closed position moving said actuator to its second position relative to the frame.

2. The apparatus of claim 1 wherein:
said first connecting means includes means defining two opposed elongate posterior slots in said receiver frame, and two opposed housing projections integral with said housing, one housing projection extended through each posterior slot, each projection having a diameter approximately equal to the width of its associated posterior slot.

3. The apparatus in claim 2 wherein:
said posterior slots are oriented downwardly and rearwardly with respect to said housing.

4. The apparatus of claim 1 werein:
said actuator means includes two opposed actuator plates mounted pivotally to said housing and integral with each other, said second connecting means including means defining two opposed elongate anterior slots in said receiver frame, and two opposed actuator projections, one projection mounted to each actuator plate and extended through one of said anterior slots, each projection having a diameter approximately equal to the width of its associated anterior slot, said actuator projections spaced from a pivot axis of said actuator plates thereby traversing an arcuate path upon actuator plate rotation.

5. The apparatus of claim 4 wherein:
said first connecting means includes means defining two opposed elongate posterior slots in said receiver frame, and two opposed housing projections integral with the housing, one housing projection extended through each posterior slot, each projection having a diameter approximately equal to the width of its associated posterior slot.

6. The apparatus of claim 4 wherein:
said detent means includes a spring mounted proximate one of said anterior slots and normally shaped to confine its associated actuator projection substantially at one end of its associated anterior slot, continued inward pivoting of said actuator plates, after said receiver frame reaches said intermmediate stage, elastically deforming said spring to allow movement of said associated projection away from said one end of said associated slot.

7. The apparatus of claim 6 wherein:
said spring is shaped to provide substantial resistance to movement of said associated actuator projection away from said one end of said associated anterior slot, and to provide negligible resistance to movement of said associated actuator projection toward said one end.

8. The apparatus of claim 1 wherein:
said detent means includes a spring mounted to said second connecting means.

9. The apparatus of claim 1 including:
a linkage coupling said actuator means and a door pivotally mounted to said housing near said anterior opening, whereby said receiver moves between said extended and retracted positions responsive to the opening and closing of said door.

10. Loading and ejection apparatus for disk drives including:
a disk cartridge including a casing, a disk carried inside said casing, means defining a cavity in a rearward facing wall of said casing, a linking member supported in said casing for forward and rearward movement with respect thereto, a biasing means for urging rearward movement of said linking member, and stop means for preventing movement of said linking member rearward beyond a linking position;
a disk drive housing having a receiver including a substantially rigid frame mounted movably with respect to the housing and adapted to receive said disk cartridge for rearward insertion to a seated position in said frame, and further to maintain the cartridge in a controlled attitude as it is so inserted, a forwardly extended probe mounted with respect to said frame and positioned to enter said cartridge through the cavity and contact said linking member as said cartridge is so inserted, further cartridge insertion after such contact moving the linking member forwardly relative to the cartridge against the force of said biasing means, a latching means mounted to said frame and positioned to engage a forward wall of said casing substantially as said cartridge reaches its seated position to so retain the cartridge against the force of said biasing means; and
a releasing means mounted to said housing, said frame being movable from a retracted position adapted for the driving of said disk, to an extended position forwardly of said retracted position for insertion of said cartridge, and an eject position forwardly of said extended position, frame movement from the extended position to the eject position moving said latching means into contact with said releasing means, thereby releasing said forward wall from said latching means to allow cartridge ejection responsive to said biasing means.

11. The apparatus of claim 10 including:
means defining an access port in said casing; and a panel mounted with respect to said linking member and in a closed position to cover said access port whenever said linking member is in said linking position, said forward linking member movement responsive to insertion of said cartridge moving said panel away from said access port to allow passage therethrough whenever the cartridge is in said seated position, said biasing means, when ejecting said cartridge, further returning said panel to its closed position.

12. The apparatus in claim 11 including:
a flexible rack means for joining said linking member and said panel; pinion means mounted rotatably to said casing and drivingly engaged with said rack means; and wherein said biasing means comprises a torsion spring biasing said pinion means toward a pinion position corresponding to said linking position.

13. A magnetic disk drive cartridge having a casing, a magnetic disk and hub in the casing, and an annular lift collar mounting said hub with respect to a top wall of said casing, wherein the improvement comprises:
means for fastening said lift collar to said top wall including a tubular support extended downwardly from the top wall, two opposed arcuate lugs extended radially outward from said support in spaced relation to said top wall, each lug having a stop at one end thereof;
said fastening means further including two arcuate flanges mounted to the top of said collar and extended radially inwardly thereof, each flange adapted for insertion between an associated lug and said top wall responsive to rotation of the collar, with respect to the top wall when positioned thereagainst, from a first angular position wherein said flanges are angularly spaced from said lugs, to a second angular position wherein said flanges and lugs are angularly aligned and each flange abutts an associated one of said stops;

at least one tab mounted with respect to the collar and positioned proximate one of said lugs when the collar is in said second angular position, to prevent substantial rotation of each flange away from its associated stop toward the first angular position.

14. In a disk drive, apparatus for facilitating operation of a disk cartridge in alternative write enable and write protect modes, the apparatus including:

a cartridge having a casing, and means in said casing defining a channel including a channel wall having first and second recesses formed therein, and first and second spaced apart ribs opposed to said wall; a write protect plug slideable in said channel and between said first and second ribs, said plug having a nodule insertable in said first recess to hold the plug in a write enable position, and insertable in a second recess to hold the plug in a write protect position, said plug further including first and second spring loaded arms for contacting, respectively, said first and second ribs thereby to urge said plug against said channel wall; and a disk drive housing in which said cartridge is driveably mounted, and switching means mounted to the housing and positioned to engage said plug when the plug is in said write enable position, said plug free of said switching means when in its write protect position.

* * * * *